(12) United States Patent
Trana et al.

(10) Patent No.: US 6,318,687 B2
(45) Date of Patent: *Nov. 20, 2001

(54) ACCESSORY MOUNT

(75) Inventors: Roger Michael Trana, Bothell; Wayne S. Hoofnagle, Redmond; Peter J. Adam, Kirkland, all of WA (US)

(73) Assignee: Fluke Corporation, Everett, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,183

(22) Filed: Aug. 31, 1998

(51) Int. Cl.⁷ ..................................................... A47B 96/06
(52) U.S. Cl. ................................ 248/220.21; 248/220.22; 248/223.41
(58) Field of Search ........................... 248/220.21, 222.11, 248/221.11, 221.13, 223.41, 224.61, 225.11, 686, 689, 688, 309.1

(56) References Cited

U.S. PATENT DOCUMENTS

| | | |
|---|---|---|
| 2,842,741 | 7/1958 | Simkins ............................... 364/156 |
| 3,135,489 * | 6/1964 | Gledhill ........................... 248/223.41 |
| 4,522,061 | 6/1985 | Hochreuther et al. ............... 73/866.5 |
| 4,909,464 * | 3/1990 | Levine et al. ....................... 248/225.1 |
| 5,081,709 | 1/1992 | Benyo et al. ......................... 224/669 |
| 5,332,183 * | 7/1994 | Kagayama ........................ 248/222.1 |
| 5,386,961 * | 2/1995 | Lu ..................................... 248/223.4 |
| 5,664,292 | 9/1997 | Chen ..................................... 24/3.12 |
| 5,730,342 | 3/1998 | Tien ..................................... 224/271 |
| 5,730,406 * | 3/1998 | Chen ............................... 248/223.41 |
| 5,833,189 * | 11/1998 | Rossman et al. ............... 248/231.61 |

* cited by examiner

Primary Examiner—Ramon O. Ramirez
Assistant Examiner—Gwendolyn Baxter
(74) Attorney, Agent, or Firm—Christensen O'Connor Johnson Kindness PLLC

(57) ABSTRACT

An accessory mount (20) for a portable instrument (26) is provided. The device includes a housing (28a and 28b) and a recess (30) located in the housing. The accessory mount also includes a frame (24) received within the recess and a fastener member (36a and 36b) attached to the frame for selectively attaching the frame within the recess. The accessory mount also includes a slot (42) that is partially formed with the frame for selectively attaching and/or positioning equipment, such as an adapter (22), to the device, thereby permitting operation of the device without requiring the use of both hands of an operator.

21 Claims, 3 Drawing Sheets

ACCESSORY MOUNT

FIELD OF THE INVENTION

The present invention relates generally to accessory mounts and, more particularly, to accessory mounts for hand-held instruments.

BACKGROUND OF THE INVENTION

Today's work environment has become more mobile with the advancement of portable technologies. This is particularly true in the areas of computers and hand-held test equipment. In this regard, computers may be easily converted from a hard wired system to a wireless system by the use of portable adapters having wireless line of sight capabilities, such as infrared (IR) adapters. Such adapters include a casing housing electronics, a cable for physical connection to the computer, and a signal transmitter/receiver port located in the casing. In operation, the computer operator physically connects one end of the cable to the computer and the other end to the adapter. The operator then aligns the receiver/transmitter port of the adapter with a corresponding communications port located in a second piece of equipment, such as a printer. The computer remains in communication with the second piece of equipment as long as the signal remains uninterrupted. Thus, portable adapters are a growing part of today's mobile work environment.

Another growing part of a mobile work environment is hand-held instruments, such as scanners and multimeters. Hand-held instruments generally include a casing housing electronics, and a probe operatively connected to the electronics by a cable. In operation, the operator typically holds the casing in one hand and holds the probe in the other hand to retrieve data for analysis on site or at a more convenient location. Such hand-held instruments bring technology into remote locations that otherwise may have been inaccessible.

Thus, the advancement of portable technology has lead to a more mobile work force by the use of instruments, such as IR adapters, scanners, and multimeters. Although portable instruments are convenient for their intended use, they are not without their problems.

One such problem of portable instruments is the cumbersome nature of the instrument itself. As noted above for hand-held instruments, operation of such instruments requires both hands of the operator. However, in certain applications, the operator may require one or both hands free to simultaneously operate another device and, therefore, needs a convenient location to place the instrument. In these situations, the operator has at least two options. First, the operator may place the instrument and probe into one hand while performing work with their free hand. Alternatively, the operator may place the instrument on the ground or place it on some structure located near the work area. Both options are undesirable because of increased risk of either dropping the probe or instrument, inadvertently stepping on the instrument, or distracting the operator's attention away from the secondary device.

Prior attempts at increasing the convenience and safety of using hand-held instruments have included attachment devices, such as strap hooks and holsters. Typically, strap hooks are fastened to the instrument casing and define a belt loop. The operator threads a belt through the belt loop, thereby strapping the instrument to their clothing. Although strap hooks are useful, they have limited utility because they are specifically adapted to be strapped to the body of the operator. Holsters for hand-held instruments are adapted to be carried on the shoulder of the operator. Such holsters include a pocket that is sized to cradle the instrument and a shoulder strap. The shoulder strap is attached to the pocket, such that the instrument may be hung from the shoulder of the operator. Holsters also have limited utility because they are not easily adaptable to accommodate other attachments, such as magnet straps or Velcro™ strips, that are adapted to hang the instrument from an object other than the operator's body.

As noted above for wireless systems having line of sight adapters, the system is functional only when the adapter is precisely aligned with the communications port of the target machine. As a result, the adapter and communications port must be aligned on the same axis to ensure an uninterrupted data link therebetween. Such alignment requires a mount for the adapter that is both stable and ensures a constant alignment of the adapter with the communications port of the corresponding machine. Currently available mounts for such adapters include mounts that are integrally molded with the casing of the adapter. Although such mounts are useful, their utility is strictly limited to use with that particular adapter. This is undesirable because the computer operator is unable to change adapters or add accessories to the existing adapter, because the mount is integrally formed with the adapter.

Thus, there exists a need for a relatively inexpensive, reliable, and convenient accessory amount capable of accommodating a variety of accessories. The present invention is directed to fulfilling this and other needs.

SUMMARY OF THE INVENTION

In accordance with the present invention, an accessory mount for a portable device is provided. The device includes a housing and a recess located in the housing. The accessory mount includes a frame received within the recess and a fastener member attached to the frame for selectively attaching the frame within the recess. The accessory mount also includes an accessory attachment member that is at least partially formed with the frame for selectively attaching and/or positioning equipment to the device, thereby permitting operation of the device without requiring the use of both hands of an operator.

In accordance with other aspects of this invention, the accessory attachment member further includes a slot defined between the frame and the recess. The slot is sized to slideably receive and fasten the equipment to the device.

In accordance with still other aspects of this invention, the accessory attachment member further includes a coupling member. The coupling member includes an end adapted to be selectively fastened within the slot and another end adapted for attaching an accessory to the device from which the device may be attached to an object.

In accordance with additional aspects of this invention, the accessory mount also includes at least a first stowage member integrally formed with the frame mount for stowing a probe connected to the device.

In accordance with additional aspects of this invention, the fastener member includes a pair of tabs located on opposite sides of the frame and each tab is sized to be received within corresponding pockets located within the recess of the device.

An accessory mount formed in accordance with the present invention has several advantages over those currently available. First, the accessory mount of the present invention permits convenient probe storage of an instrument when the probes are not in use. Second, the accessory mount of the present invention is adapted to receive a coupler. The coupler is adapted to attach a variety of accessories, such as a strap, to the instrument, such that the instrument may be hung from a variety of objects of the operator's choice. This is beneficial because such accessories permit operation of the instrument without requiring the use of both hands of the operator. Third, the accessory mount of the present invention is also capable of accommodating a variety of equipment, such as a cradle for a wireless adapter, to facilitate operation of the instrument. Thus, an accessory mount constructed in accordance with the present invention is more robust then those currently available.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
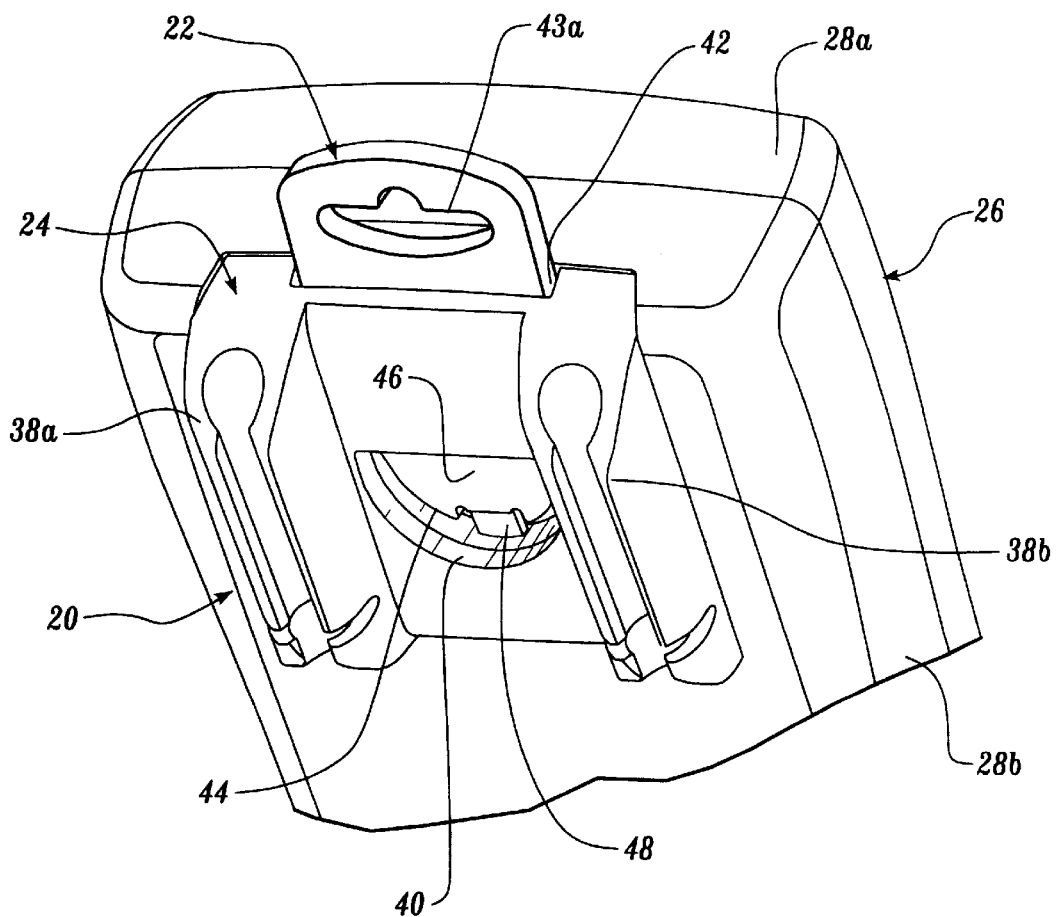
FIG. 1 is an environmental view of an accessory mount constructed in accordance with the present invention showing both a coupling member and probes stowage members.
Figure 2:
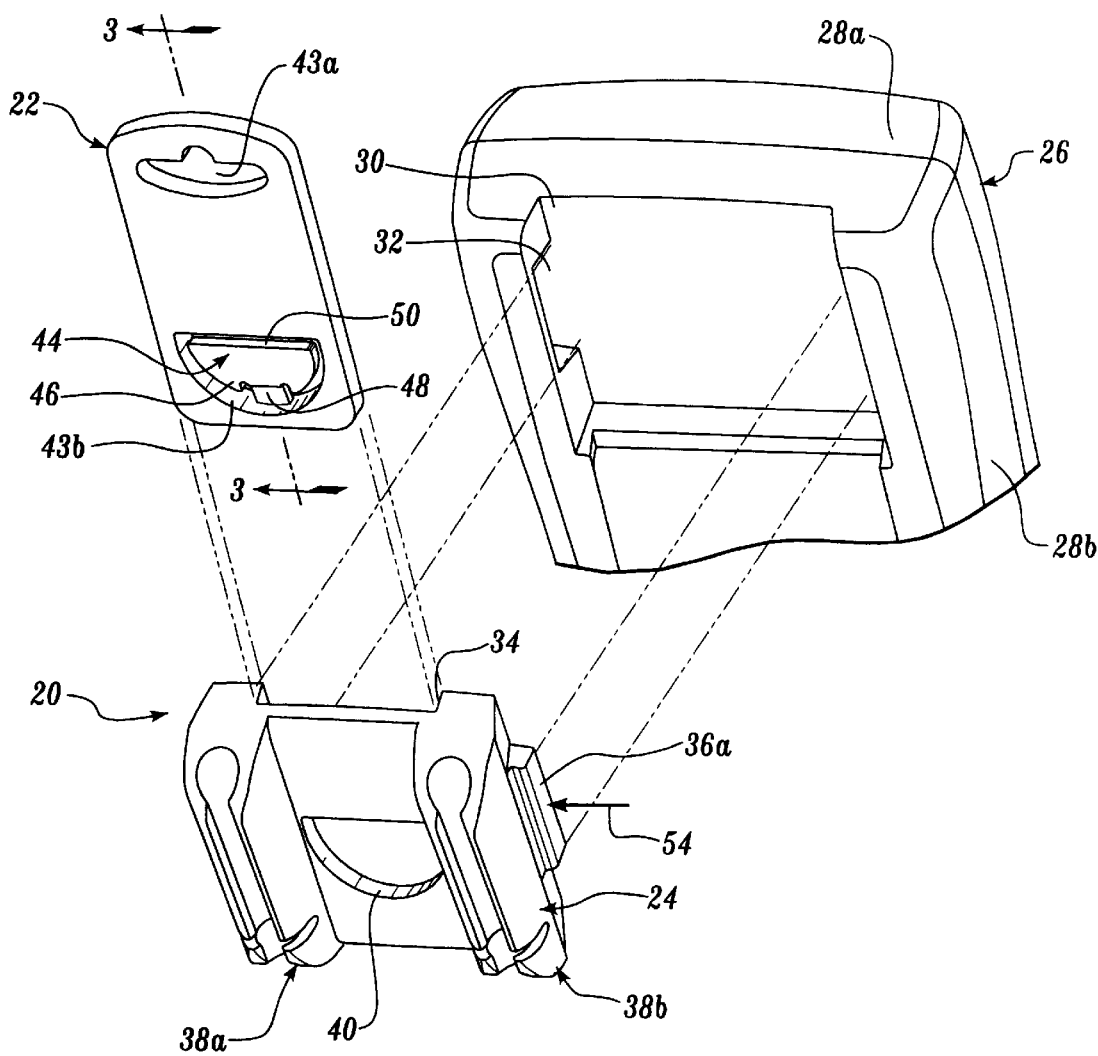
FIG. 2 is an exploded view of an accessory mount constructed in accordance with the present invention.

FIGS. 1 and 2 illustrate a preferred embodiment of an accessory mount 20 constructed in accordance with the present invention. The accessory mount 20 includes an adapter 22 and a frame 24. The accessory mount 20 is shown in an assembled position as it would be attached to a portable instrument 26. Although the use of an adapter 22 is within the scope of the present invention, the adapter 22 is not required for the invention and may be replaced by an ancillary piece of equipment to facilitate operation of the instrument 26, as is described in greater detail below.

The instrument 26 is a well-known portable instrument, such as a scanner or hand-held test equipment, and includes upper and lower housing casings 28a and 28b. The casings 28a and 28b may be injection-molded from a thermoplastic and are fastened together by well-known fasteners (not shown), such as snap fasteners or screws. The casings 28a and 28b are similarly configured and are sized to house the internal hardware (not shown), such as electronics, of the instrument 26 when the casings 28a and 28b are fastened together. Integrally formed within the outwardly facing side of the lower casing 28b is a recess 30. The recess 30 is substantially rectangular in shape and is sized to receive the frame 24 therein. The recess 30 extends from one end of the instrument 26 longitudinally therein to a predetermined point towards the other end of the instrument 26. The sides of the recess 30 each include corresponding first and second rectangularly shaped holes. The holes extend within the sides of the recess 30 in an opposed manner for a predetermined distance to define corresponding pockets 32. Although only one of the pockets 32 is illustrated in the recess 30, the opposing side of the recess 30 includes an identically configured pocket. Thus, identically configured pockets are located in opposing sides of the recess 30 to selectively fasten the frame 24 therein, as is described in greater detail below.

The frame 24 is preferably injection-molded from a well-known, semi-flexible thermoplastic, thermoelastic, or elastomeric material. The frame 24 is substantially rectangular in configuration and includes a notch 34, first and second fastener members or lock tabs 36a and 36b, first and second probe stowage members 38a and 38b, and a hole 40 extending through the thickness of one end of the frame 24. The notch 34 extends along a longitudinal axis extending between the ends of the frame 24. The notch 34 is rectangular in shape and is located in the side of the frame 24 that is adjacent the bottom of the recess 30 when the frame 24 is received therein. When the frame 24 is received within the recess 30, the notch 34 defines a rectangular slot 42 (FIG. 1) therebetween. The slot 42 is sized to selectively receive the adapter 22 therein.

The adapter 22 is preferably rectangularly shaped and is injection-molded from a thermoplastic material. Opposite ends of the adapter 22 include first and second holes 43a and 43b extending through the thickness of the adapter 22. Preferably, the first hole 43a is oblong and is sized to receive an accessory (not shown) therethrough, such as a belt or a strap, as is described in greater detail below.

Figure 3:
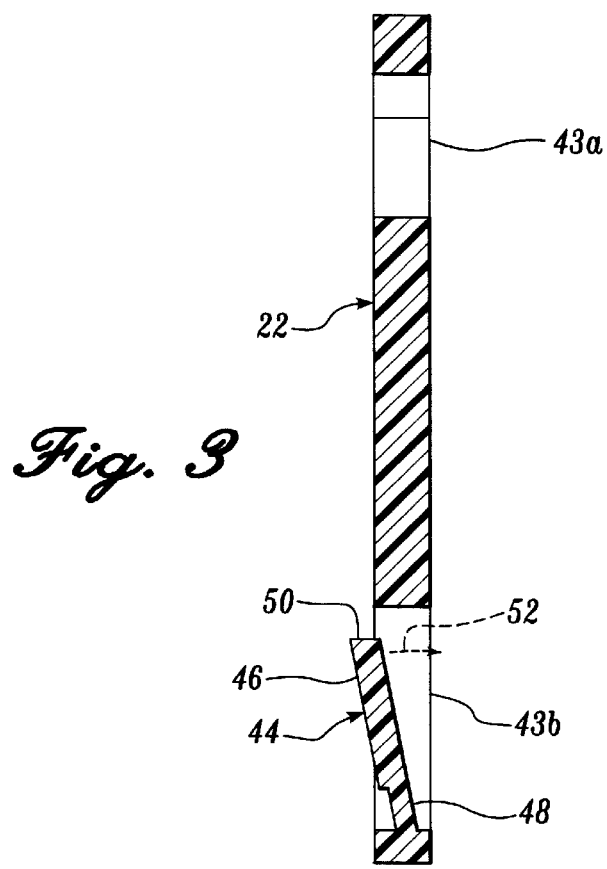
FIG. 3 is a cross-sectional side view of a coupling member for an accessory mount constructed in accordance with the present invention and showing the locking tab thereof.

As may be seen better by referring to FIGS. 2 and 3, the adapter 22 also includes a spring lock 44 integrally formed within the second hole 43b. The spring lock 44 includes a semi-circular body 46 that is flexibly connected within the hole 43b by a flange 48. As seen in FIG. 3, the spring lock 44 is biased within the hole 43b, such that the body 46 angles outwardly from the hole 43b. As attached within the hole 43b, the free end of the body 46, opposite the flange 48, projects outwardly from the adapter 22 to define an abutment edge 50. The flange 48 allows the spring lock 44 to flex within the hole 43b to selectively lock and unlock the adapter 22 within the slot 42 when the frame 24 is fastened within the recess 30 by the lock tabs 36a and 36b.

Figure 4:
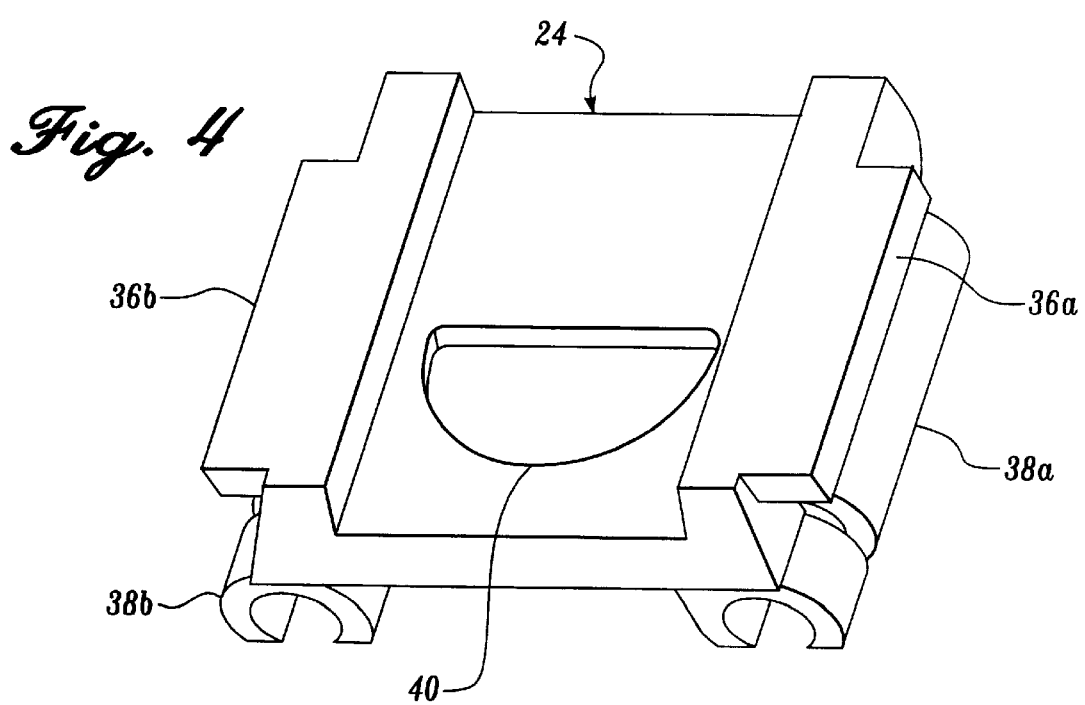
FIG. 4 is a perspective view of an accessory mount constructed in accordance with the present invention, showing the rearward facing side of the frame.

Referring to FIGS. 2 and 4, the rectangularly shaped lock tabs 36a and 36b project outwardly in an opposed manner from the sides of the frame 24. The lock tabs 36a and 36b are positioned on opposite sides of the frame 24, such that when the frame 24 is received within the recess 30, the lock tabs 36a and 36b correspond in location and size with the pockets 32 of the recess 30 to selectively lock the frame 24 therein. Thus, the lock tabs 36a and 36b are keyed to fit into the corresponding pockets 32 of the recess 30 when the frame 24 is received therein. Although it is preferred that the lock tabs 36a and 36b are integrally molded with the frame 24, other configurations, such as separate tabs that are fastened to the frame 24, are also within the scope of the present invention.

The probe stowage members 38a and 38b are preferably integrally formed with the side of the frame 24 that faces outwardly when the frame 24 is received within the recess 30. Preferably, the probe stowage members 38a and 38b are cylindrical in configuration and are located on the frame 24, such that they extend longitudinally between the ends of the frame 24. Also, the probe stowage members 38a and 38b are located on the frame 24, such that the hole 40 is positioned between the probe stowage members 38a and 38b. Each probe stowage member 38a and 38b includes a hole extending longitudinally therethrough. The hole is sized to receive an instrument probe (not shown), such as a test lead probe, for instruments 26 having such equipment. Although it is preferred that the frame 24 includes at least one probe stowage member, a frame 24 formed with more or fewer probe stowage members is also within the scope of the present invention.

Operation of an accessory mount 20 formed in accordance with the present invention may be best understood by referring to FIGS. 1–3. To attach the frame 24 within the recess 30, the sides of the frame 24 are compressed inwardly in an opposed fashion, as indicated by the arrow 54, such that the first and second lock tabs 36a and 36b pass freely within the sides of the recess 30 as the frame 24 is inserted therein. After the frame 24 is received within the recess 30, the compression load is released, thereby permitting the frame 24 to spring back into its uncompressed position. In the uncompressed position, the lock tabs 36a and 36b are received within the pockets 32, thereby locking the frame 24 within the recess 30.

After the frame 24 is received within the recess 30, the adapter 22 may be slidably received within the slot 42. The end of the adapter 22 that includes the spring lock 44 is slideably received in the slot 42. As the adapter 22 slides within the slot 42, the frame 24 passes over the spring lock 44. As the frame 24 passes over the spring lock 44, it slides against and, thereby, flexes the body 46 inwardly within the second hole 43b of the adapter 22, as indicated by the arrow 52. Thus, the adapter 22 slides into the slot 42 with minimal resistance.

The adapter 22 continues to slide within the slot 42 until the second hole 43b of the adapter 22 and the hole 40 of the frame 24 are aligned. At this point, the compressive force applied to the spring lock 44 by the frame 24 is released and the spring lock 44 unflexes and returns to its neutral position. In its neutral position, the abutment edge 50 of the body 46 springs partially into the hole 40 of the frame 24, such that the abutment edge 50 engages at least a portion of the frame 24 defining the hole 40 to resist withdrawal of the adapter 22 from the slot 42. Thus, the adapter 22 is selectively held within the slot 42 by the spring lock 44 abutting at least a portion of the frame 24.

As received within the frame 24, the end of the adapter 22 that includes the first hole 43a projects outwardly from an end of the instrument 26. The first hole 43a is adapted to receive a hanger (not shown), such as a belt or a strap having a magnet or Velcro™ attached to one end. The hanger may be attached to the first hole 43a, such that the instrument 26 may be hung from an object (not shown). Such an arrangement allows the instrument to be hung from the object, thereby permitting operation of the instrument without requiring the operator to either hold the instrument in their hand, or hang the instrument from their body.

To remove the adapter 22 from within the slot 42, the operator simply applies a compressive force against the body 46 of the spring lock 44. This force causes the body 46 to flex within the second hole 43b, such that the abutment edge 50 no longer engages the frame 24. The adapter 22 is then permitted to pass freely through the slot 42 as it is pulled out from within the slot 42.

To remove the frame 24 from within the recess 30, a pulling force is applied to the center of the frame 24 to deform the frame 24. As the frame 24 deforms, the lock tabs 36a and 36b are withdrawn from the pockets 30, thereby permitting withdrawal of the frame 24 from within the recess 30.

The previously described version of the present invention provides several advantages over accessory mounts currently available. First, the accessory mount of the present invention permits convenient probe storage of an instrument when the probes are not in use. Second, the accessory mount of the present invention is adapted to receive a coupler. This coupler is adapted to attach a variety of accessories, such as a strap, to the instrument, such that the instrument may be hung from a variety of objects of the operator's choice. Such accessories permit operation of the instrument without requiring the use of both hands of the operator. Third, the accessory mount of the present invention is also capable of accommodating a variety of equipment, such as a cradle for a wireless adapter, to facilitate operation of the equipment. Therefore, an accessory mount formed in accordance with the present invention is more robust than those currently available.

From the foregoing description, it may be seen that an accessory mount formed in accordance with the present invention incorporates many novel features and offers significant advantages over those currently available. While the presently preferred embodiment of the invention has been illustrated and described, it is to be understood that within the scope of the appended claims, various changes can be made therein without departing from the spirit of the invention. As a first nonlimiting example, the adapter 22 may be replaced by an ancillary piece of equipment, such as a cradle for an infrared adapter, to facilitate operation of the instrument 26. In this nonlimiting example, the ancillary piece of equipment may be sized to be received within the slot 42 of the accessory mount 20. On the other hand, the ancillary piece of equipment may include a coupling member attached to the equipment, such that the coupling member may be selectively received within the slot 42. Thus, although it is preferred that the accessory mount 20 of the present application includes an adapter 22, other pieces of equipment, such as a cradle for infrared equipment, may also be adapted to be received by an accessory mount constructed in accordance with the present invention. Therefore, the illustrated and described embodiment is to be considered as exemplary only and the invention itself should be evaluated only as defined in the claims that follow.

The embodiments of the invention in which an exclusive property or privilege is claimed are defined as follows:

1. An accessory mount for an instrument, the accessory mount comprising:
   (a) a frame adapted and constructed to be releasably received within a recess formed within a body of an instrument;
   (b) a fastener member formed with the frame for selectively securing the frame to the instrument; and
   (c) accessory attachment means for detachably receiving and attaching equipment to the instrument, the accessory attachment means being at least partially integrally formed with the frame, wherein the accessory attachment means includes a slot located between the frame and the recess when the accessory mount is releasably received within the recess, the slot being sized to slidably receive and fasten the equipment to the instrument.

2. The accessory mount of claim 1, wherein the accessory attachment means further comprising coupling means for selectively coupling an accessory to the instrument, the coupling means being slidably receivable within the slot.

3. The accessory mount of claim 2, wherein the coupling means is a coupling member having an end adapted to be selectively fastened within the slot and another end adapted for attaching an accessory to the instrument from which the instrument is selectively attachable to an object.

4. The accessory mount of claim 1, further comprising at least a first stowage member integrally formed with the frame for stowing a probe connected to the instrument.

5. The accessory mount of claim 1, further comprising at least a first stowage member integrally formed with the frame for stowing a probe connected to the instrument.

6. An accessory mount for a portable device, wherein the accessory mount comprises:
   (a) a frame adapted and constructed to be received within a recess formed within a housing of a device;
   (b) a fastener member attached to the frame for selectively securing the frame to the device; and
   (c) an accessory attachment member at least partially formed with the frame for detachably receiving and attaching equipment to the device, wherein the accessory attachment member further comprises a slot defined between the frame and the recess when the frame is received within the recess, the slot being sized to slidably receive and fasten the equipment to the device.

7. The accessory mount of claim 6, wherein the accessory attachment member further comprises a coupling member slidably receivable within the slot, the coupling member having an end adapted to be releasably fastened within the slot and another end adapted for attaching an accessory to the device from which the device is selectively attachable to an object.

8. The accessory mount of claim 6, further comprising at least a first stowage member integrally formed with the frame for stowing a probe connected to the device.

9. The accessory mount of claim 8, wherein the fastener member comprises a pair of tabs located on opposite sides of the frame, the tabs being sized to be received within corresponding pockets located within the recess of the device.

10. The accessory mount of claim 6, further comprising at least a first stowage member integrally formed with the frame for stowing a probe connected to the device.

11. An accessory mount for a hand-held instrument, the instrument having a housing and a recess formed within the housing, the accessory mount comprising:
    (a) a frame adapted to be selectively received within the recess and defining a slot therebetween when the frame is received within the recess;
    (b) an accessory attachment member partially formed with the frame for detachably receiving and attaching equipment to the device; and
    (c) a coupling member slidably receivable within the slot, the coupling member having an end adapted to be selectively fastened within the slot and another end adapted for attaching an accessory to the instrument from which the instrument is selectively attachable to an object.

12. The accessory mount of claim 11 further comprising at least a first stowage member for selectively attaching a probe connected to the instrument, the stowage member being at least partially integrally formed with the frame.

13. The accessory mount of claim 11, further comprising at least a first stowage member for selectively attaching a probe connected to the instrument, the stowage member being at least partially integrally formed with the frame.

14. An accessory mount for an instrument, the accessory mount comprising:
    (a) a frame adapted to be selectively received within a recess formed within a body of an instrument and defining a slot therebetween, the slot being adapted for selectively attaching equipment to the instrument;
    (b) an attachment member formed with the frame for selectively attaching the accessory mount to the instrument;
    (c) accessory stowage means for selectively attaching the accessory to the frame, the accessory stowage means being at least partially integrally formed with the frame; and
    (d) a coupling member selectively attachable to the frame, the coupling member having an end adapted to be selectively fastened within the slot and another end adapted for attaching the equipment to the instrument.

15. An accessory mount, comprising
    (a) a body having first and second ends, the body being sized for selective attachment to an instrument;
    (b) an attachment member formed with the body first end for selectively attaching an accessory to the body; and
    (c) a resilient coupling member integrally disposed on the body second end for selectively fastening the accessory mount to the instrument.

16. The accessory mount of claim 15, wherein the resilient coupling member further includes a locking tab actuatable between a locked position, wherein a portion of the locking tab engages a portion of the instrument to fasten the accessory mount to the instrument, and an unlocked position, wherein the accessory mount is selectively removable from the instrument.

17. In an instrument housing for an electronic instrument having a top casing, a bottom casing, and an elongate slot extending from a first end portion of said bottom casing in spaced relationship with a surface of said bottom casing, said surface having a lock-receiving aperture therethrough exposing at least a portion of said slot, an accessory mount comprising:
    an elongate coupling member having a proximal and a distal end and further having a spring lock integrally formed therewith, said elongate coupling member adapted and constructed to be received in said slot with said spring lock engaging said lock-receiving aperture.

18. The accessory mount of claim 17, further comprising an accessory attachment slot at the distal end of said elongate coupling member.

19. An accessory mount for an instrument, the accessory mount comprising:
    (a) a frame adapted and constructed to be releasably received within a recess formed within a body of an instrument;
    (b) a fastener member formed with the frame for selectively securing the frame to the instrument; and
    (c) accessory attachment means for detachably receiving and attaching equipment to the instrument, the accessory attachment means being at least partially integrally formed with the frame, wherein the accessory attachment means further comprising a slot located between the frame and the recess when the accessory mount is releasably received within the recess, the slot being sized to slidably receive and fasten the equipment to the instrument, wherein the accessory attachment means further comprising coupling means for selectively coupling an accessory to the instrument, the coupling means being slidably receivable within the slot.

20. The accessory mount of claim 19, wherein the coupling means is a coupling member having an end adapted to be selectively fastened within the slot and another end adapted for attaching an accessory to the instrument from which the instrument is selectively attachable to an object.

21. An accessory mount for a portable device, wherein the accessory mount comprises:
    (a) a frame adapted and constructed to be received within a recess formed within a housing of a portable device;

(b) a fastener member attached to the frame for selectively securing the frame to the device; and (c) an accessory attachment member at least partially formed with the frame for detachably receiving and attaching equipment to the device, wherein the accessory attachment member further comprises a slot defined between the frame and the recess when the frame is received within the recess, the slot being sized to slidably receive and fasten the equipment to the device, wherein the accessory attachment member further comprises a coupling member slidably receivable within the slot, the coupling member having an end adapted to be releasably fastened within the slot and another end adapted for attaching an accessory to the device from which the device is selectively attachable to an object.

* * * * *